United States Patent
Nikhara et al.

(10) Patent No.: US 12,231,768 B2
(45) Date of Patent: Feb. 18, 2025

(54) REDUCED LATENCY MODE SWITCHING IN IMAGE CAPTURE DEVICE

(71) Applicant: QUALCOMM Incorporated, San Diego, CA (US)

(72) Inventors: Soman Ganesh Nikhara, Hyderabad (IN); Jignesh Rasikbhai Patel, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 17/456,315

(22) Filed: Nov. 23, 2021

(65) Prior Publication Data
US 2023/0164433 A1 May 25, 2023

(51) Int. Cl.
*H04N 23/667* (2023.01)
*H04N 23/61* (2023.01)
*H04N 23/80* (2023.01)
*H04N 25/46* (2023.01)

(52) U.S. Cl.
CPC .......... *H04N 23/667* (2023.01); *H04N 23/61* (2023.01); *H04N 23/80* (2023.01); *H04N 25/46* (2023.01)

(58) Field of Classification Search
CPC .... H04N 23/65; H04N 23/651; H04N 23/667; H04N 23/61; H04N 23/611; H04N 23/80; H04N 25/46
See application file for complete search history.

(56) References Cited

U.S. PATENT DOCUMENTS

| | | | |
|---|---|---|---|
| 11,057,572 B1 | 7/2021 | Wang | |
| 2010/0214439 A1 | 8/2010 | Oshima et al. | |
| 2013/0329075 A1 | 12/2013 | Liang et al. | |
| 2020/0294193 A1* | 9/2020 | Chang | G06T 1/20 |
| 2021/0400185 A1* | 12/2021 | Price | H04N 23/57 |
| 2022/0329726 A1* | 10/2022 | Cho | G02B 27/0172 |

OTHER PUBLICATIONS

International Search Report and Written Opinion—PCT/US2022/078435—ISA/EPO—Feb. 8, 2023.

* cited by examiner

*Primary Examiner* — Daniel M Pasiewicz
(74) *Attorney, Agent, or Firm* — QUALCOMM Incorporated

(57) ABSTRACT

This disclosure provides systems, methods, and devices for wireless communication that support image signal processor to support reduced latency mode switching. In a first aspect, a method of image processing includes switching between different binning configurations to change an output of data from an image sensor. The binning configurations may include a first binning configuration to support object tracking and/or other artificial intelligence (AI) or computer vision (CV) applications and a second binning configuration to support photography or other still image capture applications. Other aspects and features are also claimed and described.

30 Claims, 6 Drawing Sheets

REDUCED LATENCY MODE SWITCHING IN IMAGE CAPTURE DEVICE

TECHNICAL FIELD

Aspects of the present disclosure relate generally to image processing. Some features may enable and provide improved image processing, including low latency reconfiguration of devices for image processing.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

An image sensor in an image capture device includes light-sensitive measurement devices to capture a representation of a scene by measuring light reflected by objects in the scene. The image sensors can operate in different configurations to provide the data that forms the representation of the scene. Switching between these different configurations conventionally involves providing an indication of a configuration change and waiting for the image sensor to reconfigure. Changes in the scene are not captured while the image sensor is reconfiguring and during a subsequent settle time while the image sensor output stabilizes after the reconfiguration.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Delay time due to image device reconfiguration may be reduced in some circumstances by reconfiguring a binning module processing output data from the image sensor. The binning module changes the output from the image sensor by averaging or adding multiple sensor pixels within the image sensor to obtain a single value. For example, a binning module in a 4× configuration reduces an output from an image sensor with 256 pixels from 256 values to 64 values. Reconfiguring the binning module may allow obtaining a different data format representing a scene without reconfiguring the image sensor. For example, different data formats involving low-resolution and high-resolution representations of a scene may be obtained by changing a binning configuration for processing the image data output from the image sensor. In the low-resolution configuration the image sensor may be in a first configuration and the binning module in a first configuration. In the high-resolution configuration the image sensor may be in the same first configuration and the binning module in a different second configuration. Switching between the low-resolution configuration and the high-resolution configuration thus does not involve reconfiguring the image sensor, but rather reconfiguring the binning module. In some embodiments, reconfiguring the binning module may include enabling or disabling the binning module. When the binning module is enabled, the output resolution is reduced by a factor corresponding to the binning ratio. When the binning module is disabled, the output resolution corresponds to the image sensor resolution.

The binning configuration can be changed with less delay than changing the image sensor configuration. The binning module may be a processing block that changes the format of the data without changing the operation of the image sensor in converting light into electrical signals, thus allowing for a quicker reconfiguration between output formats. Thus, the output of image frames from the image sensor can have less interruption by changing the binning configuration to change the image data format, rather than changing the image sensor configuration. In one application, the benefit of decreased data format reconfiguration can allow capturing of high-resolution images during streaming of low-resolution images without significant interruption to the streaming. This may be particularly beneficial when a high-resolution image of a scene is desired from the image sensor while the image sensor is generating low-resolution images for tracking objects in the scene. A binning module may be reconfigured to capture the high-resolution image with reduced or no interruption in the capturing of the low-resolution images, which allows for more accurate tracking of the objects in the scene.

In one aspect of the disclosure, a method for digital image capture and/or image signal processing includes receiving first image data from an image sensor; processing the first image data in a first binning configuration to extract a first set of image frames of a first image size at a first frame rate; determining to change from the first binning configuration to a second binning configuration; receiving second image data from the image sensor; and/or processing the second image data in the second binning configuration to extract a second set of image frames of a second image size at a second frame rate, the processing of the second image data based on the determining to change from the first binning configuration to the second binning configuration.

In an additional aspect of the disclosure, an apparatus includes at least one processor and a memory coupled to the at least one processor. The at least one processor is configured to perform steps comprising receiving first image data from an image sensor; processing the first image data in a first binning configuration to extract a first set of image frames of a first image size at a first frame rate; determining to change from the first binning configuration to a second binning configuration; receiving second image data from the image sensor; and/or processing the second image data in the second binning configuration to extract a second set of image frames of a second image size at a second frame rate, the processing of the second image data based on the determining to change from the first binning configuration to the second binning configuration.

In an additional aspect of the disclosure, an apparatus includes means for receiving first image data from an image sensor; means for processing the first image data in a first binning configuration to extract a first set of image frames of a first image size at a first frame rate; means for determining to change from the first binning configuration to a second binning configuration; means for receiving second image data from the image sensor; and/or means for processing the second image data in the second binning configuration to extract a second set of image frames of a second image size at a second frame rate, the processing of the second image data based on the determining to change from the first binning configuration to the second binning configuration.

In an additional aspect of the disclosure, a non-transitory computer-readable medium stores instructions that, when executed by a processor, cause the processor to perform operations. The operations include receiving first image data from an image sensor; processing the first image data in a first binning configuration to extract a first set of image frames of a first image size at a first frame rate; determining to change from the first binning configuration to a second binning configuration; receiving second image data from the image sensor; and/or processing the second image data in the second binning configuration to extract a second set of image frames of a second image size at a second frame rate, the processing of the second image data based on the determining to change from the first binning configuration to the second binning configuration.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor, such as in a binning module. The image processing techniques described in embodiments disclosed herein may be performed by circuitry, such as a binning module, in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor, binned image data from an image sensor, or corrected image frames processed by one or more algorithms, such as in a binning module, within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction, such as binning described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, frames for object tracking, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
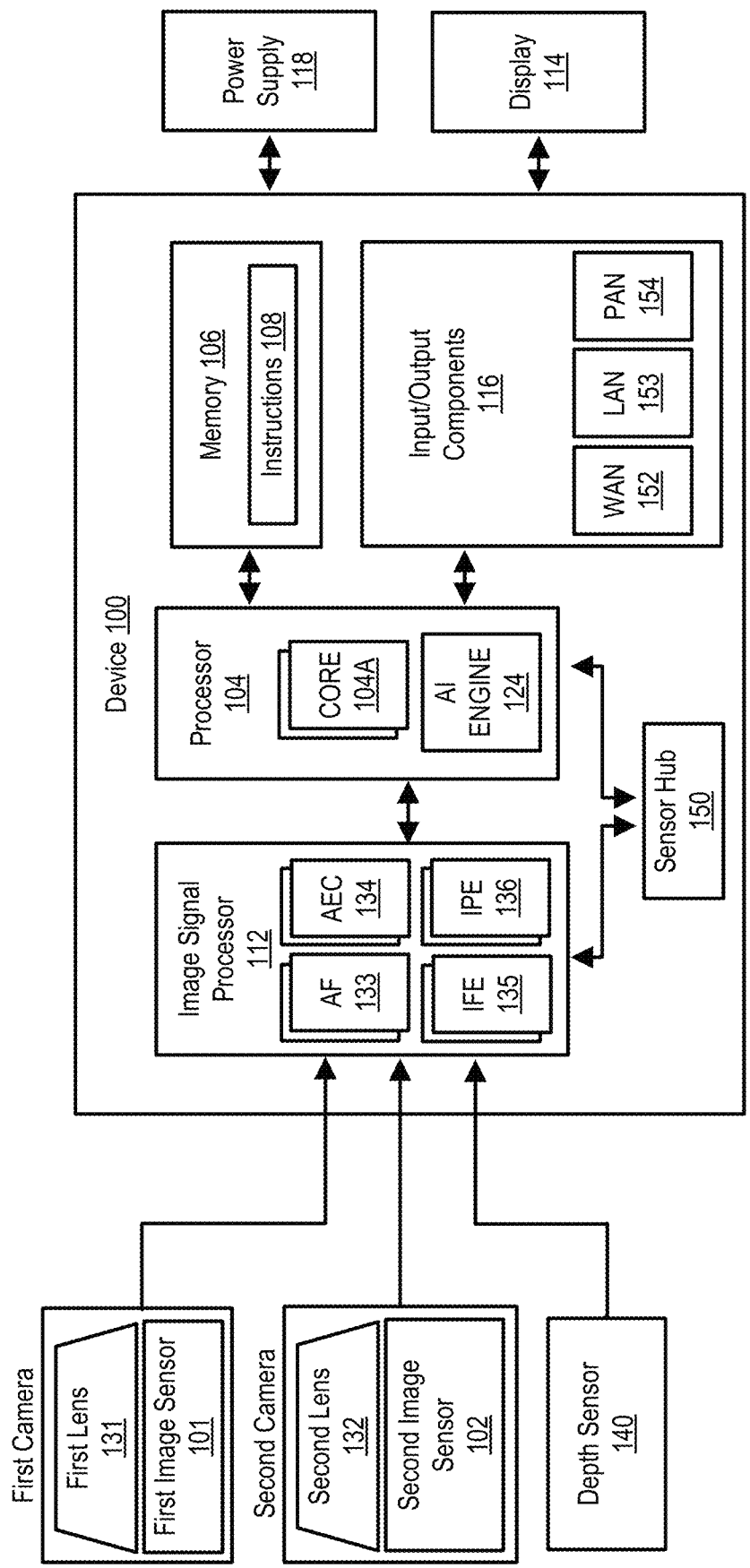
FIG. 1 shows a block diagram of an example device 100 for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support changing image capture device reconfiguration by reconfiguring a binning module to change a characteristic of an output image frame. The binning module may be reconfigured from a first binning configuration to a second binning configuration in response to a trigger, such as a user input, detection of an event, or matching of a rule.

Particular implementations of the subject matter described in this disclosure may be implemented to realize one or more of the following potential advantages or benefits. In some aspects, the present disclosure provides techniques for reduced latency in reconfiguring the image capture device. In some aspects, the techniques may improve the operation of object tracking operations (or other artificial intelligence (AI) or computer vision (CV) operations) by reducing interruption in a first low-resolution stream of image frames in which objects are tracked. In some aspects, the techniques may improve photography performed while performing object tracking operations or other operations involving the first low-resolution stream of image frames. The improved photography may be a result of the reduced latency during reconfiguration of a binning module by allowing quicker obtaining of a high-resolution image frame during the operations involving the first low-resolution stream of image frames.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. One or more of the image sensors may include a reconfigurable binning module. Additionally or alternatively, one or more of the image signal processors (ISPs) may include a reconfigurable binning module. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is a IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and or one or more auto exposure compensation (AEC) 134 engines. The AF 133, AEC 134, AFE 135, APE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including binning operations. For example, execution of the instructions can instruct the image signal processor 112 to begin or end capturing an image frame or a sequence of image frames, in which the capture includes binning as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2B:
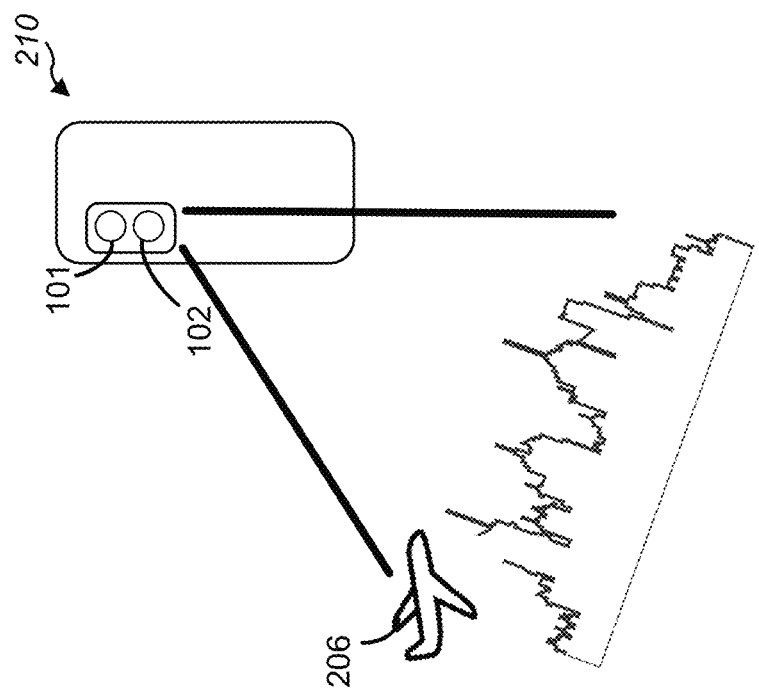
FIG. 2B is an illustration of a mobile device with integrated cameras with reconfigurable output format observing a scene according to some embodiments of the disclosure.
Figure 2A:
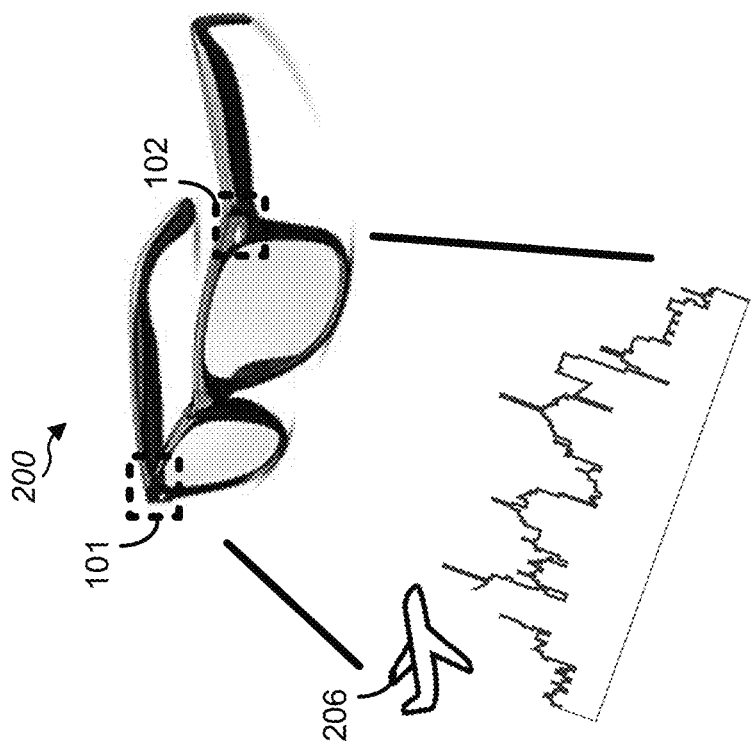
FIG. 2A is an illustration of a mobile device with integrated cameras with reconfigurable output format observing a scene according to some embodiments of the disclosure.

Example applications for image capture devices with reconfigurable binning are shown in FIG. 2A and FIG. 2B. One application shown in FIG. 2A is for a pair of glasses configured as an image capture device with integrated image sensors in the temples and/or other locations within the glasses. Glasses 200 may include image sensors 101 and 102 integrated in a frame and configured to have an overlapping field of view to allow determination of depth for objects in a scene or to have a non-overlapping field of view to allow capturing panoramic images. The image sensors 101 and/or 102 may be configured to capture high-resolution image data representing the scene in front of the glasses 200. A processor within the glasses 200 or receiving image data from the glasses 200 may perform tracking of an object, such as airplane 206, in the scene. A button may be integrated into the glasses 200 and used as a trigger to capture a still image frame, similar to a shutter of a camera, although other triggers may cause the capture of the still image frame. Although tracking is described as one application, the first binning configuration may support other applications, such as artificial intelligence (AI) or computer vision (AV) applications. Likewise, although still image frame capture is described as one application, the second binning configuration may support other photography applications.

Conventionally the trigger may cause the image sensors 101 and/or 102 to reconfigure from a low-resolution configuration for tracking the airplane 206 to a high-resolution configuration for capturing a still image frame, and back to the low-resolution configuration for continuing tracking of the airplane 206. Each reconfiguration of the image sensors 101 and/or 102 may involve turning off the image stream from the image sensors, loading new registers, turning on the image stream from the image sensors, and skipping an initial number of frames while output from the image sensor stabilizes.

According to embodiments of this disclosure the trigger may cause a binning reconfiguration for processing of data from the image sensors 101 and/or 102. During reconfiguration of the binning, the image stream from the image sensors 101 and/or 102 remains active and the image sensors remain in the same configuration. The binning configuration change reduces the output of the image sensors to a lower resolution. A trigger to capture a still image frame may result in decreasing the ratio in the binning configuration and/or disabling the binning, such that high-resolution (e.g., higher than the low resolution obtained with the first binning configuration or with binning enabled) image data is obtained for the still image frame. The binning configuration may be returned to the enabled or higher ratio for the low-resolution binning configuration after capturing the still image frame, with tracking continuing in the low-resolution binning configuration.

Processing of high-resolution image data may use a higher amount of processing resources to track the object 206 than processing of low-resolution image data. Low-resolution image data may be desired for tracking purposes to reduce the level of processing resources used to track the object 206 and to reduce power consumption by the processor. The binning reconfiguration upon detection of a trigger may reduce the time for obtaining the still image frame in a high resolution from the time of the trigger, and reduce the delay in returning to capturing image data in a low resolution for tracking purposes. The still image frame may thus be a more accurate representation of the scene at the time of the trigger. Further, the tracking may be more accurate by reducing the amount of time image data is not available for tracking.

Although glasses 200 are shown in the embodiment of FIG. 2A as an example application of techniques of this disclosure, the techniques may be applied to different image capture devices. For example, the binning reconfiguration may be performed on a mobile device 210, such as a cellular phone or tablet computing device, shown in FIG. 2B.

Figure 3:
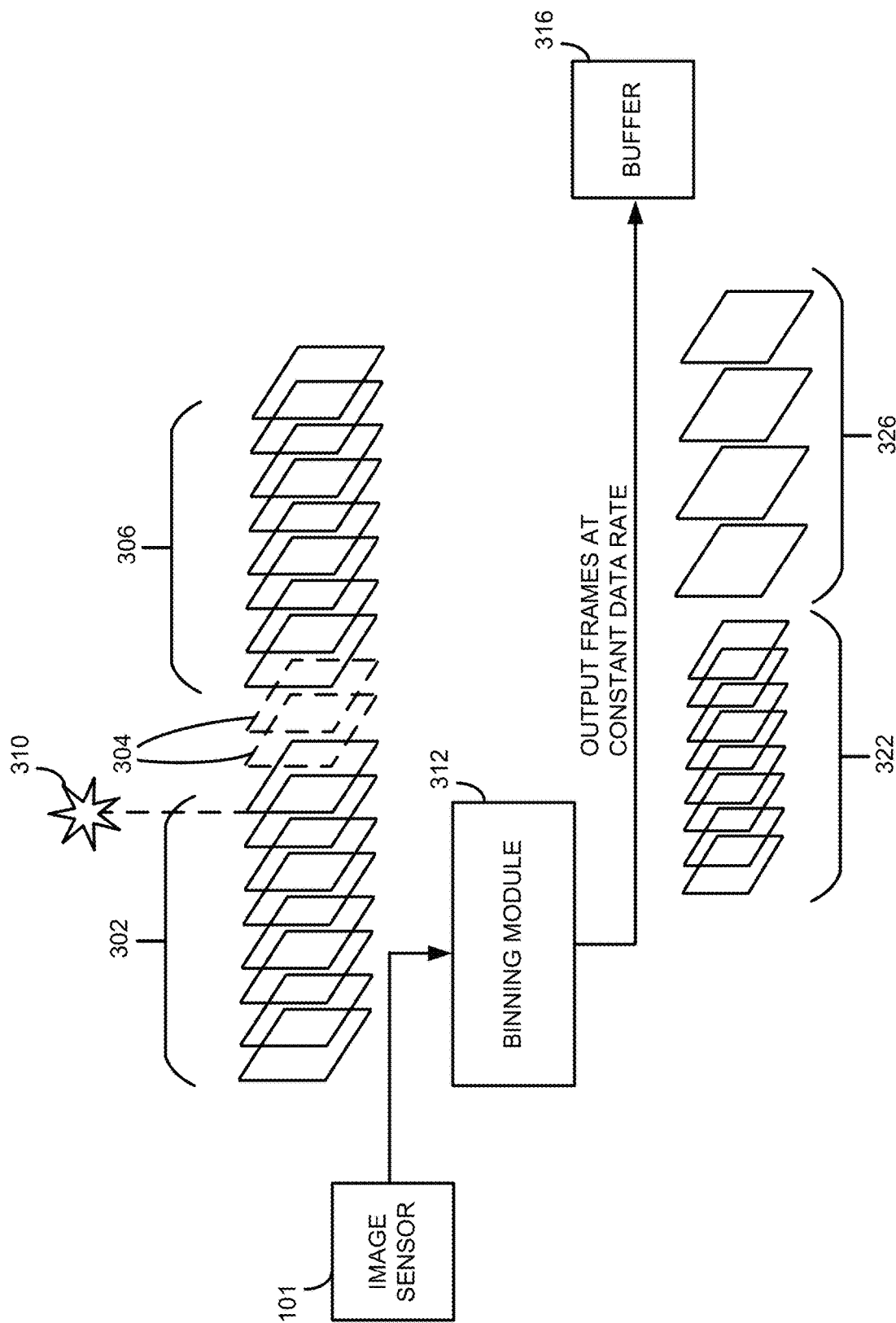
FIG. 3 is a block diagram illustrating a binning reconfiguration during a stream of image data according to some embodiments of the disclosure.

The operation of the binning reconfiguration on an image data stream output from an image sensor is illustrated in FIG. 3. FIG. 3 is a block diagram illustrating a binning reconfiguration during a stream of image data according to some embodiments of the disclosure. The image sensor 101 may output image data 302, 304, and 306 captured over a progression of time. A binning module 312 receives as input the image data 302, 304, and 306 from an output of the image sensor 101 and forms output image frames 322 and 326 for storage in buffer 316.

A trigger, such as a shutter depression, causing a binning reconfiguration may occur at time 310 during collection of image data. Before the trigger 310, the binning module 312 may be in a first configuration in which the binning module 312 receives and processes image data 302 to generate image frames 322 of a first size. After the trigger 310, the binning module 312 may be in a second configuration in which the binning module 312 receives and processes image data 306 to generate image frames 326 of a second size. The second size may be larger or smaller than the first size, and a ratio of the first size to the second size may correspond to a ratio change of the binning configuration. For example, a change in binning configuration from 4× to 2× may result in the second size being 4× larger than the first size. Images frames 326 of the second size contain a representation of a scene that is a higher resolution than image frames 322 of the first size. In some embodiments, some image data 304 may be discarded during generation of the output frames after reconfiguring the binning module 312. The data discard may allow stabilization of the image data after the binning reconfiguration occurring at the time 310. In some embodiments, no frames may be discarded.

The binning module 312 may remain in the second configuration or automatically return to the first configuration based on certain criteria. In some embodiments, the binning module 312 may return to the first configuration after a certain amount of time or a certain number of output frames. For example, the binning module 312 may return to the first configuration after one still image frame is captured. As another example, the binning module 312 may return to the first configuration after three still image frames are captured, in which the first two image frames may correspond to image data 304 that is discarded during the binning reconfiguration and the third image frame is the still image frame captured for the user. In some embodiments, the binning module 312 may return to the first configuration after another trigger is obtained. For example, the binning module 312 may enter the second configuration upon the press of a button, capture still image frames while the button is pressed, and then return to the first configuration upon release of the button. As another example, the binning module 312 may enter the second configuration upon the press of a button, and capture sill image frames at a high resolution until a second press of the button causes the binning module 312 to return to the first configuration.

In some embodiments, the data rate for the output frames from the binning module 312 may be maintained at a constant data rate by adjusting a frame rate of the output image frames in the first binning configuration and the second binning configuration. When the second size is larger than the first size, the frame rate of the image frames 326 may be reduced from the frame rate of the image frames 322 by a ratio corresponding to a ratio change of the binning configuration. Maintaining a constant data rate may be advantageous to reduce or eliminate other changes in an image processing pipeline receiving the image frames 322 and 326. For example, the image frames 322 and 326 may be transmitted over a data bus to another component for processing, displaying, and/or transmitting. Maintaining a constant data rate on the data bus may reduce or eliminate changing the configuration of the data bus to match the data rate of the output image frames, further reducing delays between the trigger and the still capture frame due to reconfiguration.

In some embodiments, buffering image data in the buffer 316 may store the image data in a buffer of a first size. Buffering of the second image data may be performed in a buffer of the same first size as for buffering the first image data. A buffer may be included between the image sensor 101 and the binning module 312, and the buffer may be allocated with the same size for both or multiple binning configurations.

Figure 4:
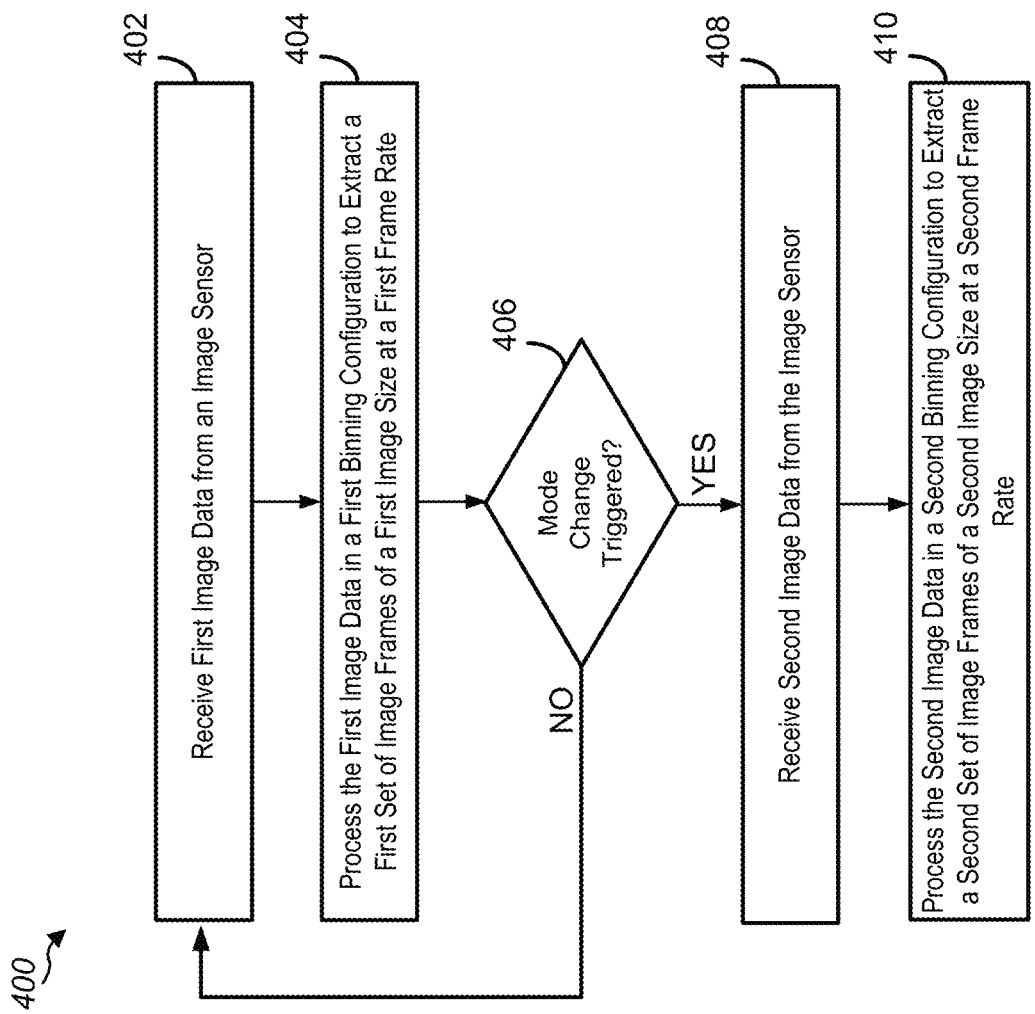
FIG. 4 is a flow chart illustrating a method of processing a stream of image data in different binning configurations according to some embodiments of the disclosure.

Techniques for operating an image capture device with different binning configurations are described with reference to FIG. 4. FIG. 4 is a flow chart illustrating a method of processing a stream of image data in different binning configurations according to some embodiments of the disclosure. A method 400 includes, at block 402, receiving first image data from an image sensor. At block 404, the first image data is processed in a first binning configuration to extract a first set of image frames of a first image size at a first frame rate. The first set of image frames may be used for a first application, such as a tracking application. The tracking application may track an object movement through a scene. Example tracking applications include tracking cars on a road, tracking birds in the sky, tracking drones in the sky, and tracking people in a field. The tracking application may include object recognition capability and/or motion vector determination capability. In some embodiments, the tracking application may perform object recognition to determine a user-specified object for tracking in a scene followed by motion vector determination to track movement of the object in the scene. The tracking application may use the first set of frames obtained using a binning configuration that allows detection of rapid movement, in which higher frame rates may be advantageous for accurately tracking movement of the object. In such an application, the frame size may be less important than the frame rate such that a smaller frame size obtained by a high binning ratio may be used for the first configuration. A smaller frame size may have the benefit of reducing processing resources and/or power consumption when executing the tracking application. Other applications may alternatively or additionally consume the first set of image frames at a first frame rate and a first size.

At block 406, a mode change trigger may be detected. If no trigger is received, further first image data is received at block 402 and processed at block 404. If a trigger is detected, a binning reconfiguration occurs. The trigger may be received user input and/or based on specified criteria. For example, the trigger may be the activation of a button on a mobile device. As another example, the trigger may be a command received over a network connection, such as a button pressed on a remote that is transmitted to the image capture device through a wireless connection such as a personal area network (PAN). As a further example, the trigger may be a criteria based on detecting a certain event in the scene. An example criteria may be when movement of a tracked object slows down to below a threshold. These example indications may include analyzing the first image data to determine object locations and/or movement speeds, or other analysis, such as analysis by artificial intelligence (AI) or machine learning algorithms. After determining to change from the first binning configuration to a second binning configuration by a mode change trigger, the image capture device continues to blocks 408 and 410.

At block 408, second image data is received from the image sensor. The second image data may be the same format, such as the same data rate, same frame rate, and/or same image size, as the first image data received at block 402. The second image data may be received from the image sensor without the image sensor reconfiguring from the receipt of the first image data. At block 410, the second image data is processed in a second binning configuration to extract a second set of image frames of a second image size at a second frame rate. In different embodiments, the first and second image frames may be different and/or the first and second frame rates may be different. The second binning configuration for processing at block 410 may be a different binning ratio than the binning configuration for processing at block 404. For example, the first binning configuration may be 4× binning and the second binning configuration may be 2× binning. In another example, the first binning configuration may be 4× binning (e.g., binning is enabled) and the second binning configuration may be 0× binning (e.g., binning is disabled). In some embodiments, a data bus for transmitting the first set of image frames and the second set of image frames may be maintained at a same bus frequency when operating in the first binning configuration and the second binning configuration because the data rate of the first set of image frames at the first frame rate and the first image size is equal to the data rate of the second set of image frames at the second frame rate and the second image size.

Additional binning configurations beyond two configurations may be supported for producing further sets of image frames with one or more different image sizes and/or frame rates. Various triggers may be defined through one or more rules to switch the image capture device between the first, second, and additional binning configurations. In some embodiments, the various binning configurations may result in combinations of frame rates and image sizes that result in a constant data rate output from the binning module in each of the configurations.

The processing in different binning configurations described with reference to FIG. 2, FIG. 3, and FIG. 4 may be performed in various components of an image capture device. In some embodiments, such as the embodiment shown in FIG. 5, the binning is performed in circuitry of a camera that includes the image sensor. In some embodiments, such as the embodiment shown in FIG. 6, the binning is performed in circuitry of an image signal processor coupled to the camera that includes the image sensor.

Figure 5:
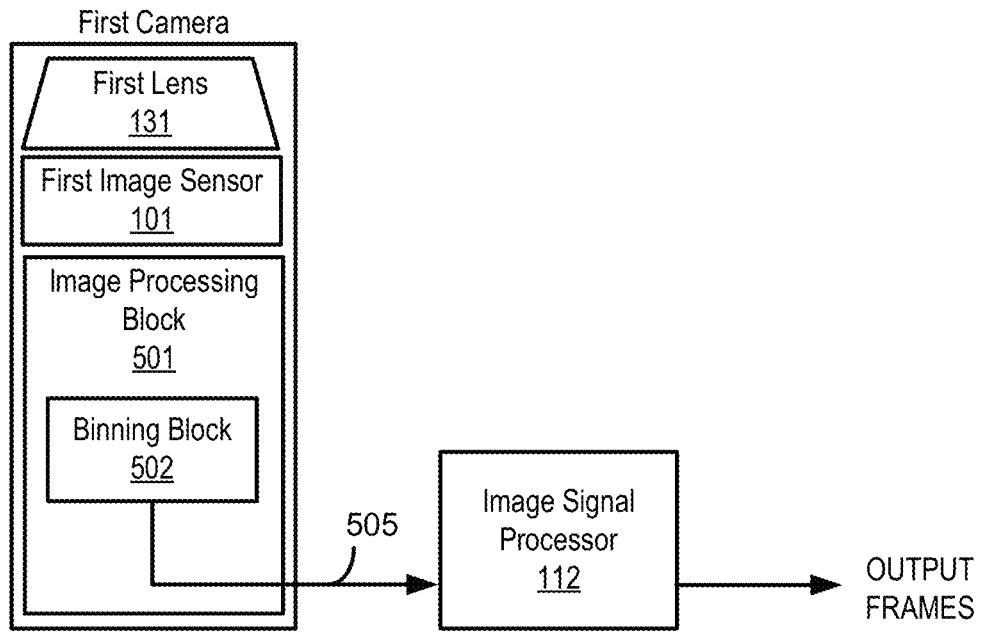
FIG. 5 is a block diagram illustrating a configuration for a reconfigurable binning module according to some embodiments of the disclosure.

FIG. 5 is a block diagram illustrating a configuration for a reconfigurable binning module according to some embodiments of the disclosure. A binning block 502 may be integrated in an image processing block 501 of a first camera that includes the first image sensor 101. The image processing block 501 may be a processor that includes digital circuitry, such as memory and logic circuitry, and/or analog circuitry. The first camera may be coupled to the image signal processor 112 through a data bus 505, which may be carried through conductors in a circuit board and/or conductors in a ribbon or other cable. The binning block 502 may be reconfigured between a first, second, and/or additional binning configurations. Output image frames from the binning block 502 may be supplied at a constant data rate to the image signal processor 112 in two or more different binning configurations. The data bus coupling the binning block 502 and image signal processor 112 may be operated at a fixed clock speed and/or without reconfiguration of clock speed or other parameters when reconfiguring the binning block 502. Output image frames from the image signal processor 112 may be supplied to a memory device for storage as a picture or a video, a network transmission device for transmission of a picture or a video to another device, a display device for display of a picture or a video to a user, and/or another processing device, such as a CPU, a GPU, a DSP, or an ASIC, for processing of the output image frames.

Figure 6:
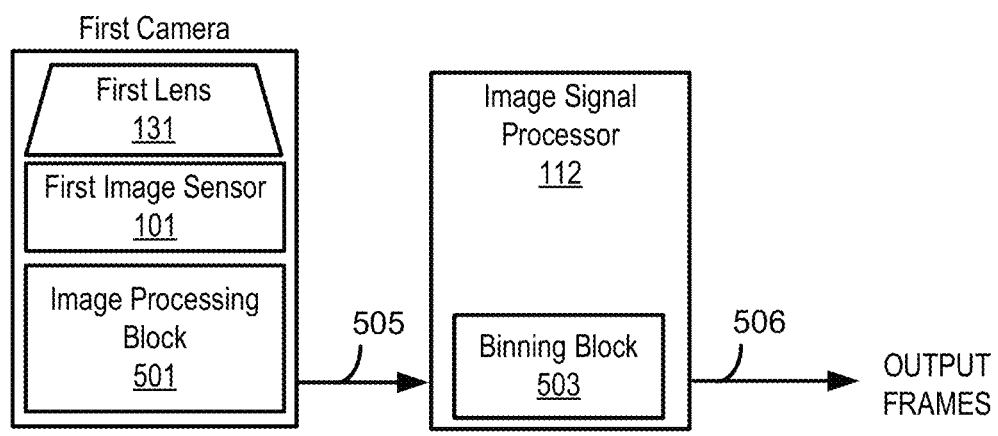
FIG. 6 is a block diagram illustrating a configuration for a reconfigurable binning module according to some embodiments of the disclosure.

FIG. 6 is a block diagram illustrating a configuration for a reconfigurable binning module according to some embodiments of the disclosure. Output data from the image processing block 501 of the first camera may be provided to image signal processor 112 over the data bus 505. The image signal processor 112 may include a binning block 503 that switches between the first, second and/or other binning configurations. The output image data from the first camera over the data bus 505 may be a constant data rate stream regardless of the binning configuration of binning block 503 such that the data bus 505 is not reconfigured when switching the binning configuration. The binning block 503 processes the image data from the first camera to generate output image frames with various combinations of image sizes and/or frame rates. In some embodiments, the image sizes and/or frame rates are adjusted in the different binning configurations to maintain a constant data rate output from the image signal processor 112 to other components over another data bus 506.

In some embodiments, certain aspects of the configuration of the first camera may be changed when the binning configuration is changed. For example, the first camera may be configured to obtain image data with a particular exposure time. Changing frame rates may result in a frame time that is shorter than a configured exposure time. For example, image frames captured at 30 frames per second (fps) for a first binning configuration have a frame time of 1/30 seconds. The first camera may have an exposure time determined as 1/40 seconds, which is supported because the exposure time is shorter than the frame time. If the frame rate changes to 60 frames per second (fps) for a second binning configuration then the frames have a frame time of 1/60 seconds, which is shorter than the configured exposure time. The exposure time can be reduced to 1/60 seconds or shorter to allow capture of image frames at the new frame rate at the new binning configuration.

Figure 7:
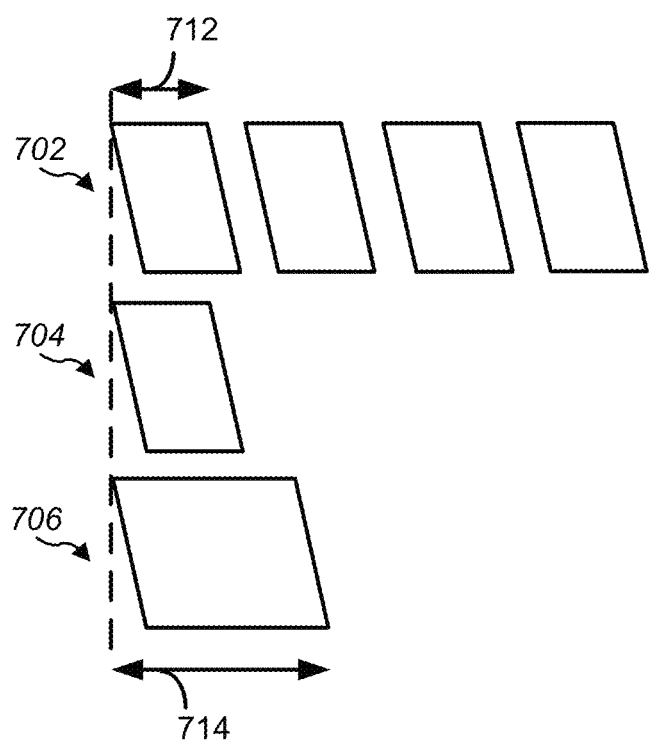
FIG. 7 is a timing diagram illustrating a change in exposure time associated with a change in binning reconfiguration according to some embodiments of the disclosure.

Switching to a higher frame rate may include decreasing an exposure time to be equal to or less than a frame time at the higher frame rate. Similarly, switching to a lower frame rate may include increasing an exposure time to above a frame time at the higher frame rate and less than or equal to a frame time at the lower frame. Increasing the exposure time may improve the image quality at the lower frame rate, such as to produce a higher quality image for a still image capture during low light conditions. FIG. 7 is a timing diagram illustrating a change in exposure time associated with a change in binning reconfiguration according to some embodiments of the disclosure. A sequence 702 includes a frame time 712 followed by an empty duration for a blanking time and VGA data transfer time, followed by a next frame time. In an example first configuration at a frame rate of 120 fps and an image frame size of VGA (640×480), a maximum exposure time is 8.33 milliseconds (msec). In an example second configuration at a frame rate of 30 fps and an image frame size of HD (1280×960), a maximum exposure time is 33 msec. A sequence 704 includes a frame time 712 followed by an increased blanking and data transfer time. A new image frame may be captured after an appropriate waiting time period for the new frame rate. A sequence 706 includes an exposure time 714 followed by an appropriate blanking and data transfer time for the frame rate and exposure time. The exposure time 714 may be determined through an auto exposure (AE) algorithm to be double the exposure time 712, such as 16.66 msec. The AE algorithm may be provided the frame rate or binning configuration such that the AE algorithm selects an exposure time best suited for the current binning configuration. An image capture device may switch between a first binning configuration that operates in sequence 702 and a second binning configuration that operates in sequence 704. An AE algorithm or other operation may determine to increase the exposure time and switch to sequence 706 instead of sequence 704 or determine to later switch from sequence 704 to sequence 706 based on changing scene conditions. When the binning configuration returns to the first binning configuration while operating in sequence 706, the exposure time may be reduced to operate in sequence 702. In some embodiments, a change in exposure time may include determining a frame time corresponding to the second frame rate is less than the first exposure time; and configuring a second exposure time less than the first exposure time for the image sensor for capturing the second image data from the image sensor based on determining the frame time corresponding to the second frame rate is less than the first exposure time.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to capture and/or process image data, such as in an image capture device. The apparatus is further configured to perform steps including receiving first image data from an image sensor; processing the first image data in a first binning configuration to extract a first set of image frames of a first image size at a first frame rate; determining to change from the first binning configuration to a second binning configuration; receiving second image data from the image sensor; and/or processing the second image data in the second binning configuration to extract a second set of image frames of a second image size at a second frame rate, the processing of the second image data based on the determining to change from the first binning configuration to the second binning configuration. Additionally, the apparatus may perform or operate according to one or more aspects as described below. In some implementations, the apparatus includes a wireless device, such as a user equipment (UE) or a base station (BS). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of image processing may include one or more operations described herein with reference to the apparatus.

In a second aspect, in combination with the first aspect, the first processor is configured to perform determining to change from the first binning configuration to the second binning configuration by receiving an indication to switch from a tracking mode to an image capture mode.

In a third aspect, in combination with one or more of the first aspect or the second aspect, the first processor is configured to perform determining to change from the first binning configuration to the second binning configuration by receiving a user input comprising an indication to switch from a first mode to a second mode.

In a fourth aspect, in combination with one or more of the first aspect through the third aspect, the first processor is configured to perform determining to change from the first binning configuration to the second binning configuration based on analysis of the first image data.

In a fifth aspect, in combination with one or more of the first aspect through the fourth aspect, the first processor is configured to perform receiving the first image data by receiving the first image data at a first data rate, and to perform receiving the second image data by receiving second image data at the first data rate.

In a sixth aspect, in combination with one or more of the first aspect through the fifth aspect, the first image size is smaller than the second image size.

In a seventh aspect, in combination with one or more of the first aspect through the sixth aspect, the second binning configuration is a binning configuration specifying no binning of the second image data.

In an eighth aspect, in combination with one or more of the first aspect through the seventh aspect, the first processor is configured to perform the receiving the first image data by receiving the first image data over a data bus at a first bus frequency, and to perform the receiving the second image data by receiving the second image data over the data bus at the first bus frequency.

In a ninth aspect, in combination with one or more of the first aspect through the eighth aspect, the first processor is configured to perform the receiving the first image data by buffering the first image data in a buffer of a first size, and to perform the receiving the second image data by buffering the second image data in the buffer of the first size.

In a tenth aspect, in combination with one or more of the first aspect through the ninth aspect, the first processor is configured to perform the receiving the first image data by receiving the first image data captured by the image sensor with a first exposure time.

In an eleventh aspect, in combination with one or more of the first aspect through the tenth aspect, the first processor is further configured to perform steps comprising: determining a frame time corresponding to the second frame rate is less than the first exposure time; and/or configuring a second exposure time less than the first exposure time for the image sensor for capturing the second image data from the image sensor based on determining the frame time corresponding to the second frame rate is less than the first exposure time.

In a twelfth aspect, in combination with one or more of the first aspect through the eleventh aspect, the apparatus further includes a second processor coupled to the first processor, wherein the second processor is configured to perform steps comprising one or more of: tracking an object based on the first set of image frames; and/or storing a still image frame based on the second set of image frames, wherein the first processor is configured: to perform the determining to change from the first binning configuration to the second binning configuration by receiving a user input comprising an indication to switch from a tracking mode corresponding to the first binning configuration to an image capture mode corresponding to the second binning configuration; to perform the receiving the first image data by receiving the first image data at a first data rate; and/or to perform the receiving the second image data by receiving second image data at the first data rate.

In one or more aspects, techniques for supporting image processing may include additional aspects, such as any single aspect or any combination of aspects described below or in connection with one or more other processes or devices described elsewhere herein. In a thirteenth aspect, supporting image processing may include an apparatus configured to capture and/or process image data, such as in an image capture device. The apparatus includes a first camera comprising a first image sensor and a first image processing block; a data bus coupled to the first camera; and/or an image signal processor coupled to the first camera through the data bus. The apparatus may perform or operate according to one or more aspects as described below. In some implementations, the apparatus includes a wireless device, such as a user equipment (UE) or a base station (BS). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of image processing may include one or more operations described herein with reference to the apparatus.

In a fourteenth aspect, in combination with one or more of the first aspect through the thirteenth aspect, the first image processing block comprises a binning module, the first image processing block having a first binning configuration and a second binning configuration; the first image processing block in the first binning configuration is configured to transmit a first set of image frames of a first image size at a first frame rate based on first image data received from the first image sensor over the data bus to the image signal processor; and/or the first image processing block in the second binning configuration is configured to transmit a second set of image frames of a second image size at a second frame rate based on second image data received from the first image sensor over the data bus to the image signal processor.

In a fifteenth aspect, in combination with one or more of the first aspect through the fourteenth aspect, the first image processing block is configured to switch between the first binning configuration and the second binning configuration based on an indication to switch from a tracking mode to an image capture mode.

In a sixteenth aspect, in combination with one or more of the first aspect through the fifteenth aspect, the first image processing block in the first binning configuration is configured to enable binning of the first image data, and wherein the first image processing block in the second binning configuration is configured to disable binning of the second image data.

In a seventeenth aspect, in combination with one or more of the first aspect through the sixteenth aspect, the first image processing block is configured to transmit the first set of image frames at a first data rate on the data bus and configured to transmit the second set of image frames at the first data rate on the data bus.

In an eighteenth aspect, in combination with one or more of the first aspect through the seventeenth aspect, the first image processing block is configured to adjust an exposure time for the first image sensor from a first exposure time corresponding to the first binning configuration to a second exposure time corresponding to the second binning configuration.

In one or more aspects, techniques for supporting image processing may include additional aspects, such as any single aspect or any combination of aspects described below or in connection with one or more other processes or devices described elsewhere herein. In a nineteenth aspect, supporting image processing may include an apparatus configured to capture and/or process image data, such as in an image capture device. The apparatus includes a first camera comprising a first means for capturing image data representing a scene and a first means for processing image data; a data bus coupled to the first means for processing image data; and/or a processor coupled to the first camera through the data bus. The apparatus may perform or operate according to one or more aspects as described below. In some implementations, the apparatus includes a wireless device, such as a user equipment (UE) or a base station (BS). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of image processing may include one or more operations described herein with reference to the apparatus.

In a twentieth aspect, in combination with one or more of the first aspect through the nineteenth aspect, the first means for processing image data has a first binning configuration and a second binning configuration; the first means for processing image data in the first binning configuration is configured to transmit a first set of image frames of a first image size at a first frame rate based on first image data received from the first means for capturing image data over the data bus to the processor; and/or the first means for processing image data in the second binning configuration is configured to transmit a second set of image frames of a second image size at a second frame rate based on second image data received from the first means for capturing image data over the data bus to the processor.

In a twenty-first aspect, in combination with one or more of the first aspect through the twentieth aspect, the first means for processing image data is configured to switch between the first binning configuration and the second binning configuration based on an indication to switch from a tracking mode to an image capture mode.

In a twenty-second aspect, in combination with one or more of the first aspect through the twenty-first aspect, the first means for processing image data in the first binning configuration is configured to enable binning of the first image data, and wherein the first image processing block in the second binning configuration is configured to disable binning of the second image data.

In a twenty-third aspect, in combination with one or more of the first aspect through the twenty-second aspect, the first means for processing image data is configured to transmit the first set of image frames at a first data rate on the data bus and configured to transmit the second set of image frames at the first data rate on the data bus.

In a twenty-fourth aspect, in combination with one or more of the first aspect through the twenty-third aspect, the first means for processing image data is configured to adjust an exposure time for the first means for capturing image data from a first exposure time corresponding to the first binning configuration to a second exposure time corresponding to the second binning configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
receiving first image data from an image sensor;
processing the first image data in a first binning configuration to extract a first set of image frames of a first image size at a first frame rate and to perform a computer vision (CV) operation on an object in a scene based on the first set of image frames in a computer vision mode;
determining to change from the first binning configuration to a second binning configuration to switch from the computer vision mode operating according to the first binning configuration to an image capture mode for capturing the object in the scene according to the second binning configuration;
receiving second image data from the image sensor;
processing the second image data in the second binning configuration to extract a second set of image frames of a second image size at a second frame rate, the processing of the second image data based on the determining to change from the first binning configuration to the second binning configuration; and
determining an output image frame comprising the object in the scene based on at least one image frame of the second set of image frames.

2. The method of claim 1, wherein determining to change from the first binning configuration to the second binning configuration comprises receiving an indication to switch from a tracking mode to the image capture mode.

3. The method of claim 2, wherein receiving the indication to switch from the tracking mode to the image capture mode comprises receiving a user input comprising an indication to switch from a first mode to a second mode.

4. The method of claim 2, wherein receiving the indication to switch from the tracking mode to the image capture mode is based on analysis of the first image data.

5. The method of claim 1, wherein receiving the first image data comprises receiving the first image data at a first data rate, and wherein receiving the second image data comprises receiving second image data at the first data rate, and wherein the first image size is smaller than the second image size.

6. The method of claim 5, wherein the second binning configuration is a binning configuration specifying no binning of the second image data.

7. The method of claim 1, wherein the receiving the first image data comprises receiving the first image data over a data bus at a first bus frequency, and wherein the receiving the second image data comprises receiving the second image data over the data bus at the first bus frequency.

8. The method of claim 1, wherein receiving the first image data comprises buffering the first image data in a buffer of a first size, and wherein receiving the second image data comprises buffering the second image data in the buffer of the first size.

9. The method of claim 1, wherein receiving the first image data comprises receiving the first image data captured by the image sensor with a first exposure time,
the method further comprising:
determining a frame time corresponding to the second frame rate is less than the first exposure time; and
configuring a second exposure time less than the first exposure time for the image sensor for capturing the second image data from the image sensor based on determining the frame time corresponding to the second frame rate is less than the first exposure time.

10. The method of claim 1, further comprising:
tracking the object in the scene based on the first set of image frames; and
storing a still image frame based on the second set of image frames,
wherein:
the computer vision mode comprises a tracking mode for tracking the object in the scene;
determining to change from the first binning configuration to the second binning configuration comprises receiving a user input comprising an indication to switch from the tracking mode corresponding to the first binning configuration to the image capture mode corresponding to the second binning configuration;
receiving the first image data comprises receiving the first image data at a first data rate; and
receiving the second image data comprises receiving second image data at the first data rate.

11. An apparatus, comprising:
an image device comprising an image sensor;
a first processor configured to receive image data from the image device, the first processor configured to perform steps comprising:
receiving first image data from the image sensor;
processing the first image data in a first binning configuration to extract a first set of image frames of a first image size at a first frame rate and to perform a computer vision (CV) operation on an object in a scene based on the first set of image frames in a computer vision mode;
determining to change from the first binning configuration to a second binning configuration to switch from the computer vision mode operating according to the first binning configuration to an image capture mode for capturing the object in the scene according to the second binning configuration;
receiving second image data from the image sensor;
processing the second image data in the second binning configuration to extract a second set of image frames of a second image size at a second frame rate, the processing of the second image data based on the determining to change from the first binning configuration to the second binning configuration; and
determining an output image frame comprising the object in the scene based on at least one image frame of the second set of image frames.

12. The apparatus of claim 11, wherein the first processor is configured to perform determining to change from the first binning configuration to the second binning configuration by receiving an indication to switch from a tracking mode to the image capture mode.

13. The apparatus of claim 12, wherein the first processor is configured to perform determining to change from the first binning configuration to the second binning configuration by receiving a user input comprising an indication to switch from a first mode to a second mode.

14. The apparatus of claim 12, wherein the first processor is configured to perform determining to change from the first binning configuration to the second binning configuration based on analysis of the first image data.

15. The apparatus of claim 11, wherein the first processor is configured to perform receiving the first image data by receiving the first image data at a first data rate, and to perform receiving the second image data by receiving second image data at the first data rate, and wherein the first image size is smaller than the second image size.

16. The apparatus of claim 15, wherein the second binning configuration is a binning configuration specifying no binning of the second image data.

17. The apparatus of claim 11, wherein the first processor is configured to perform the receiving the first image data by receiving the first image data over a data bus at a first bus frequency, and to perform the receiving the second image data by receiving the second image data over the data bus at the first bus frequency.

18. The apparatus of claim 11, wherein the first processor is configured to perform the receiving the first image data by buffering the first image data in a buffer of a first size, and to perform the receiving the second image data by buffering the second image data in the buffer of the first size.

19. The apparatus of claim 11, wherein the first processor is configured to perform the receiving the first image data by receiving the first image data captured by the image sensor with a first exposure time, and
wherein the first processor is further configured to perform steps comprising:
determining a frame time corresponding to the second frame rate is less than the first exposure time; and
configuring a second exposure time less than the first exposure time for the image sensor for capturing the second image data from the image sensor based on determining the frame time corresponding to the second frame rate is less than the first exposure time.

20. The apparatus of claim 11, further comprising a second processor coupled to the first processor, wherein the second processor is configured to perform steps comprising:
tracking the object in the scene based on the first set of image frames; and
storing a still image frame based on the second set of image frames,
wherein the first processor is configured:
to perform the determining to change from the first binning configuration to the second binning configuration by receiving a user input comprising an indication to switch from a tracking mode corresponding to the first binning configuration to the image capture mode corresponding to the second binning configuration;
to perform the receiving the first image data by receiving the first image data at a first data rate; and
to perform the receiving the second image data by receiving second image data at the first data rate.

21. An apparatus, comprising:
a first camera comprising a first image sensor and a first image processing block;
a data bus coupled to the first camera; and
an image signal processor coupled to the first camera through the data bus,
wherein the first image processing block comprises a binning module, the first image processing block having a first binning configuration and a second binning configuration,
wherein the first image processing block in the first binning configuration is configured to transmit a first set of image frames of a first image size at a first frame rate based on first image data received from the first image sensor over the data bus to the image signal processor,
wherein the first image processing block in the second binning configuration is configured to transmit a second set of image frames of a second image size at a second frame rate based on second image data received from the first image sensor over the data bus to the image signal processor, and
wherein the first image processing block is configured to switch from a computer vision mode for performing a computer vision (CV) operation on an object in a scene captured in the first set of image frames according to the first binning configuration to an image capture mode for capturing the object in the scene for an output image frame based on at least one of the second set of image frames according to the second binning configuration.

22. The apparatus of claim 21, wherein the first image processing block is configured to switch between the first binning configuration and the second binning configuration based on an indication to switch from a tracking mode to an image capture mode.

23. The apparatus of claim 21, wherein the first image processing block in the first binning configuration is configured to enable binning of the first image data, and wherein the first image processing block in the second binning configuration is configured to disable binning of the second image data.

24. The apparatus of claim 21, wherein the first image processing block is configured to transmit the first set of image frames at a first data rate on the data bus and configured to transmit the second set of image frames at the first data rate on the data bus.

25. The apparatus of claim 21, wherein the first image processing block is configured to adjust an exposure time for the first image sensor from a first exposure time corresponding to the first binning configuration to a second exposure time corresponding to the second binning configuration.

26. An apparatus, comprising:
a first camera comprising a first means for capturing image data representing a scene and a first means for processing image data;
a data bus coupled to the first means for processing image data; and
a processor coupled to the first camera through the data bus,
wherein the first means for processing image data has a first binning configuration and a second binning configuration,
wherein the first means for processing image data in the first binning configuration is configured to transmit a first set of image frames of a first image size at a first frame rate based on first image data received from the first means for capturing image data over the data bus to the processor,
wherein the first means for processing image data in the second binning configuration is configured to transmit a second set of image frames of a second image size at a second frame rate based on second image data received from the first means for capturing image data over the data bus to the processor, and
wherein the first means for processing image data is configured to switch from a computer vision mode for performing a computer vision (CV) operation on an object in a scene captured in the first set of image frames according to the first binning configuration to an image capture mode for capturing the object in the scene for an output image frame based on at least one of the second set of image frames according to the second binning configuration.

27. The apparatus of claim 26, wherein the first means for processing image data is configured to switch between the first binning configuration and the second binning configuration based on an indication to switch from a tracking mode to the image capture mode.

28. The apparatus of claim 26, wherein the first means for processing image data in the first binning configuration is configured to enable binning of the first image data, and wherein the first means for processing image data in the second binning configuration is configured to disable binning of the second image data.

29. The apparatus of claim 26, wherein the first means for processing image data is configured to transmit the first set of image frames at a first data rate on the data bus and configured to transmit the second set of image frames at the first data rate on the data bus.

30. The apparatus of claim 26, wherein the first means for processing image data is configured to adjust an exposure time for the first means for capturing image data from a first exposure time corresponding to the first binning configuration to a second exposure time corresponding to the second binning configuration.

* * * * *